P. BARNHART.
Cultivator.
No. 58,973.
Patented Oct 23, 1866.
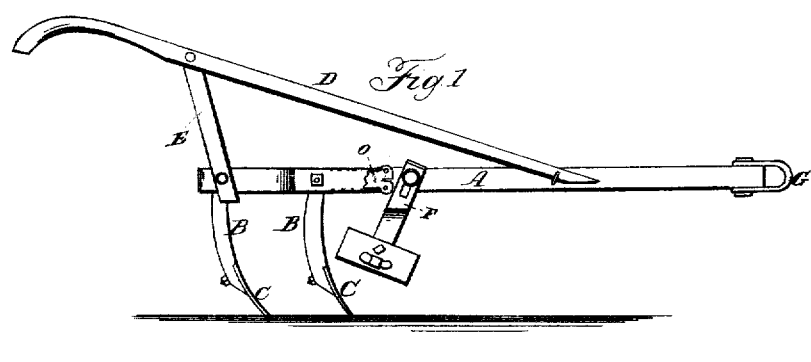
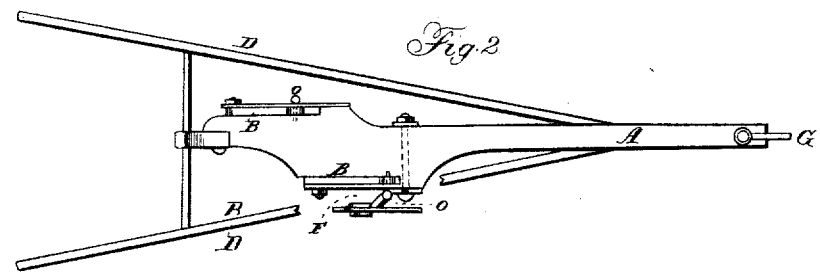

UNITED STATES PATENT OFFICE.

PETER BARNHART, OF CHILLICOTHE, OHIO.

IMPROVEMENT IN CORN-PLOWS.

Specification forming part of Letters Patent No. 58,973, dated October 23, 1866.

*To all whom it may concern:*

Be it known that I, PETER BARNHART, of Chillicothe, Ross county, and State of Ohio, have invented a new and Improved Corn-Plow; and I do hereby declare that the following is a full, clear, and exact description thereof, which will enable others skilled in the art to make and use the same, reference being had to the accompanying drawings, forming part of this specification.

The nature of my invention consists in the peculiar shape of the beam for a corn-plow. It also consists in the peculiar and novel form of the standards to which the shares are attached; also, a movable fender, which prevents the ground from being thrown onto the crops, making one of the most economical implements used on the farm.

To enable others skilled in the art to make and use my invention, I will proceed to describe its construction and operation.

Figure 1 is a side elevation of my improved corn-plow. Fig. 2 is a top-plan view of the same.

Letters of like name and kind refer to like parts in each of the figures.

A represents the beam of my improved plow, having projections upon each side near the rear end, to which is attached the standards B B, to which are attached the shares C C.

The tops of these standards B B are turned forward at right angles, and run longitudinal with the beam, thus forming an elbow, through which the standard is secured to the beam by means of a pivot-bolt, while the forward end, running parallel with the beam, is secured and prevented from turning by means of a wooden pin, so that in case the plow meets with any obstruction the pin breaks, and the plow turns back without injury to the plows.

D D are the handles, which are secured to near the front end of the beam, and extend back, and supported by standards E E.

F is a fender, secured to the beam just forward of the plows by means of a pivot-bolt. In the standard of this fender is a slot, so that it can be adjusted to any height desired. There is also a slot provided in the fender-plate, so that it may be adjusted as desired.

G is the device, of ordinary construction, to which the horse is attached to operate the plow.

It will here be observed that at the forward end of the standards are provided several holes for the introduction of the wooden pin O, so that the plows may be set at any desired angle.

This plow is simple and cheap in its construction and efficient in its operation.

Having thus described my invention, what I claim as new, and desire to secure by Letters Patent of the United States, is—

The adjustable fender F and beam A, in combination with the standards B B, for the purposes and substantially as described.

PETER BARNHART.

Witnesses:
JAS. H. FOX,
W. W. MCNEAL.